J. O. ASPELIN.
FISHHOOK.
APPLICATION FILED AUG. 15, 1921.

1,417,482.

Patented May 30, 1922.

Inventor
Julius O. Aspelin
By A. M. Carlsen,
Attorney

UNITED STATES PATENT OFFICE.

JULIUS O. ASPELIN, OF SKANDIA TOWNSHIP, MURRAY COUNTY, MINNESOTA.

FISHHOOK.

1,417,482.      Specification of Letters Patent.      Patented May 30, 1922.

Application filed August 15, 1921. Serial No. 492,608.

*To all whom it may concern:*

Be it known that I, JULIUS O. ASPELIN, a citizen of the United States, residing in Skandia Township, in the county of Murray and State of Minnesota, have invented a new and useful Fishhook, of which the following is a specification.

My invention relates to fish-hooks including the class of hooks known as trolling hooks, and the object is to provide a light and efficient expanding hook of such construction that the uncertainty of hooking a fish biting at the bait is reduced to a minimum.

Figure 1:
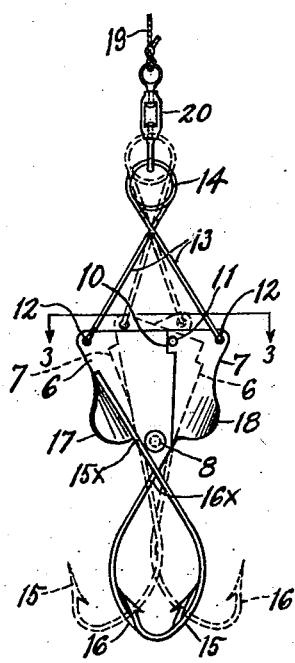
Fig. 1 is a side elevation of my improved fish-hook shown attached to a fishing line, omitting arms 13.

Referring to the drawing by reference numerals, 6 and 7 are metal plates normally in oppositely disposed parallel relation and partly overlapping each other and are loosely mounted on a pivot 8 in lower ends of the overlapping portions and an intermediate spacing washer 9 serving as a tilting point for both plates.

Plate 6 has a shoulder 10 adjacent its upper inside corner and adapted to be engaged by a pin 11 fixed in plate 7. The upper outside corners of the plates are perforated as at 12 to receive the lower ends of arms 13 of a coil spring 14; said spring arms being crossed and tend to spring the plates 6 and 7 in over each other to approximately position shown dotted in Fig. 1.

On the outside surface and parallel to the downwardly extending outer edge of each plate 6 and 7 I secure by any suitable means the straight shank portions 15× and 16× of two fish-hooks 15 and 16 respectively having their hooked and pointed portions oppositely disposed (see Figs. 1 and 2) in spaced parallel relation.

Plates 6 and 7 are preferably provided with wing portions 17 and 18 respectively curved in a manner to cause the device to rotate or spin around when drawn through the water.

Figure 4:
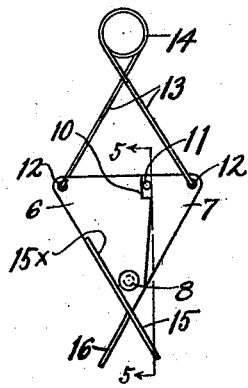
Fig. 4 is a front elevation of the device in modified form and omitting the bent portions of the fish-hooks.

In the modified form shown in Fig. 4 the wings 17 and 18 are omitted, but in either form the plates may be highly polished or colored to lure the fish toward it.

A fish line 19 may be tied directly to coil spring 14, but it is best to attach one end of a swivel connection 20 to said coil and attach the line 19 to the other end of connection 20, permitting the device to spin in the water without twisting the line.

Figures 2, 3:
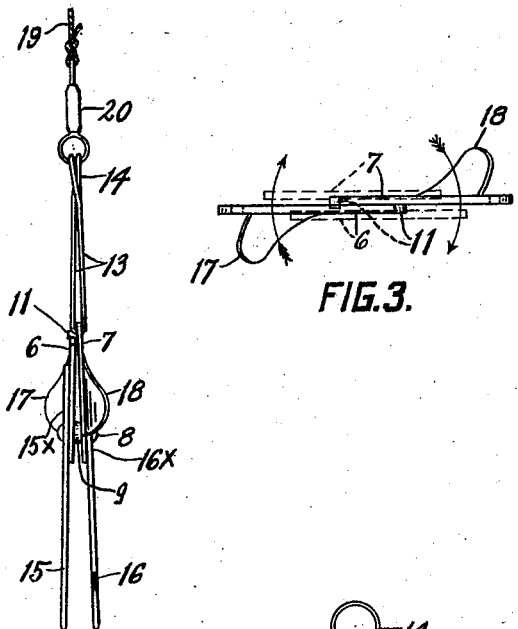
Fig. 2 is a right hand edge view of Fig. 1.
Fig. 3 is an enlarged detail on line 3—3 in Fig. 1.
Figure 5:
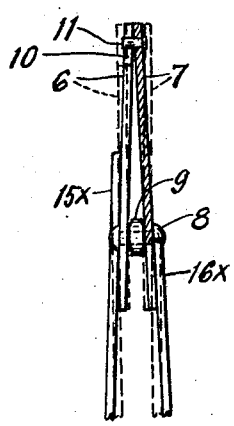
Fig. 5 is an enlarged sectional elevation on line 5—5 in Fig. 4.

The normal or sprung position of the device is approximately as shown in dotted lines in Figs. 1, 3, and 5, plates 6 and 7 and hooks 15 and 16 all being in parallel relation and spaced according to thickness of washer 9.

The device is used in the following manner:

First, the hooks are suitably baited and are then pushed in over each other until the plates 6 and 7 reach the position shown in Fig. 1, the upper ends of the plates being pressed together so that pin 11 engages shoulder 10. The said pressing together of the plates causes a slight transverse pivotal action at pivot 8 causing the hooks with their bait to spread apart. The setting of the plates automatically spreads spring arms 13 and creates tension in said arms tending to spring the plates together as previously described.

With the device thus set and line attached it can be dropped into the water and pulled forward either by the motion of the boat or by swinging the end of the fish pole or by regular casting with reel and rod or any other manner of pulling a line through the water. The hook may also be used for still fishing.

Any fish attempting to close its mouth over the bait will cause the hooks to be brought toward each other, thereby springing plates 6 and 7 to their normally spaced parallel relation, pin 11 thereby becoming disengaged from shoulder 10 and spring arms 13 instantly spring the plates inward and the fish-hooks are instantly spread outward, hooking the fish two ways.

When the hooks are baited and the device ready for use as in Fig. 1 it will be readily seen that my device is practically a weedless hook also.

What I claim is:

1. In a device of the class described, a coil spring adapted to be secured to the end of a fish line and having its ends formed with crossing arms normally tending to close toward each other, a pair of metal plates pivotally attached at their upper ends to said arms and having their lower parts loosely pivoted together in overlapped position and spaced apart at the pivoted point, a fish hook secured to each plate and arranged to overlap each other in parallel spaced relation when the device is set, and means at the upper ends of the plates for catching and holding the plates and the spring arms in spread position when the hooks are in overlapped position, said holding means arranged to be disengaged by swinging the hooks laterally toward each other, the pivot joint affording both swinging and tilting movement of the plates.

2. The structure specified in claim 1, said means for holding the plates spread against the tension of the spring arms consisting of a pin in one plate adapted to engage the adjacent edge of the opposite plate when the two plates are tilted together at their upper ends.

3. The structure specified in claim 2, said plates having each a laterally curved wing to cause the device to rotate when drawn through the water.

In testimony whereof I affix my signature.

JULIUS O. ASPELIN.